United States Patent Office 3,239,524
Patented Mar. 8, 1966

3,239,524
3-PHENYL-4-DIALKYLAMINOALKOXY-CINNOLINES
Harman S. Lowrie, Glenview, Ill., assignor to G. D. Searle & Co., Chicago, Ill., a corporation of Delaware
No Drawing. Filed July 13, 1964, Ser. No. 382,349
6 Claims. (Cl. 260—250)

The present invention relates to a group of 4-substituted 3-phenylcinnolines. In particular, it relates to a group of ethers which can be represented by the following general formula

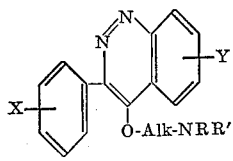

wherein Alk is a lower alkylene radical separation the nitrogens attached thereto by at least 2 carbon atoms; —NRR' is selected from the group consisting of di(lower alkyl)amino, 1-pyrrolidinyl, piperidino, morpholino, and 4-methyl-1-piperazinyl; and X and Y are each selected from the group consisting of hydrogen, halogen, methyl, and methoxy.

The lower alkylene radicals referred to above contain up to 6 carbon atoms and can be exemplified by ethylene, propylene, trimethylene, tetramethylene, and similar divalent radicals. The lower alkyl radicals referred to above contain up to 6 carbon atoms and can be exemplified by methyl, ethyl, propyl, isopropyl, butyl, hexyl, and the like. The halogen radicals referred to above include fluorine, chlorine, bromine, and iodine.

The organic bases of this invention form nontoxic addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of the present invention are conveniently prepared from the appropriately substituted 4-cinnolinols. Such compounds are converted to metal salts by dissolving them in an appropriate base such as potassium hydroxide. The salt is then reacted with an aminoalkyl halide of the formula RR′N-Alk-Halogen wherein halogen is preferably chlorine or bromine. The present compounds can also be prepared from the reaction of the appropriate 4-chlorocinnoline with an alkali-metal salt of a dialkylaminoalkanol or similar compound.

The compounds of this invention are useful because of their pharmacological properties. In particular, they possess hypotensive activity. In addition they possess antibiotic activity against a variety of organisms. Thus, they inhibit the growth of bacteria such as *Diplococcus pneumoniae*, protozoa such as *Tetrahymena gelleii*, and algae such as *Chlorella vulgaris* and they inhibit germination of seeds of Trifolium.

The following examples are presented to further illustrate the present invention; they should not be construed as limiting it in spirit or in scope. In these examples, quantities are in parts by weight and temperatures in degrees centigrade (°C.).

*Example 1*

To a solution of 6.6 parts of 3-phenyl-4-cinnolinol and 3.3 parts of 85% potassium hydroxide pellets in 320 parts of 2-propanol is added 7 parts of 2-diethylaminoethylchloride. The resultant mixture is refluxed and stirred for 2.5 hours and then cooled and filtered. The solvent is evaporated from the filtrate under reduced pressure and the resultant residue is diluted with ether, and then washed with dilute potassium hydroxide solution and extracted with dilute hydrochloric acid. The acid extract is made alkaline with dilute potassium hydroxide and then extracted with ether. The ether solution is dried, first with saturated sodium chloride solution and then with potassium carbonate and the solvent is evaporated from the resultant dried solution. The residue is dissolved in hot ethanol with a equimolar amount of maleic acid. When the solution is cooled yellow crystals separate. This material is the maleic acid salt of 4-(2-diethylaminoethoxy)-3-phenylcinnoline and it melts at about 160–164° C. The free base of this compound has the following formula

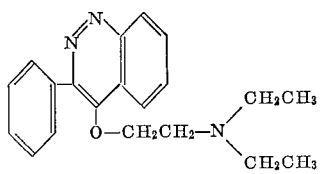

*Example 2*

The procedure of Example 1 is repeated using 4.4 parts of 3-phenyl-4-cinnolinol, 5 parts of potassium hydroxide, 6.4 parts of 3-dimethylaminopropyl chloride hydrochloride, and 2-propanol as solvent. Reaction of the crude free base thus obtained with maleic acid gives the maleic acid salt of 4-(3-dimethylaminopropoxy)-3-phenylcinnoline melting at about 190–191° C. The free base of this compound has the following formula

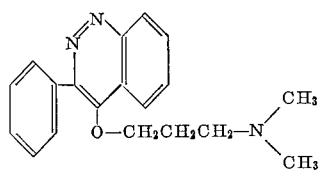

*Example 3*

6.4 parts of 3-phenyl-4-cinnolinol, 6.5 parts of potassium hydroxide and 9 parts of 2-dimethylamino-ethyl chloride hydrochloride are reacted in 2-propanol according to the procedure described in Example 1. The crude product is isolated from the reaction mixture according to the procedure described in the same example. In this case, the residue is dissolved in ethanol and mixed with an excess of hydrogen chloride which is used as a saturated solution in 2-propanol. The resultant solution is diluted with ether to precipitate a yellow powder which is 4-(2-dimethylaminoethoxy)-3-phenylcinnoline hydrochloride. This compound melts at about 211–214° C.

*Example 4*

An equivalent quantity of 2-piperidinoethyl chloride is substituted for the 2-diethylaminoethyl chloride and the procedure described in Example 1 is repeated. In this case, the product is the maleic acid salt of 3-phenyl-4-(2-piperidinoethoxy)cinnoline.

Likewise, if an equivalent quantity of 2-morpholinoethyl chloride is substituted for the 2-diethylaminoethyl chloride and the procedure of Example 1 is repeated, the product obtained is the maleic acid salt of 4-(2-morpholinoethoxy)-3-phenylcinnoline. This compound has the following formula

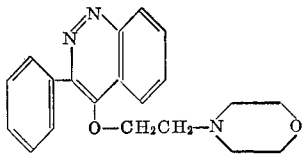

Example 5

The procedure of Example 1 is repeated using 4.2 parts of 3-phenyl-4-cinnolinol, 10 parts of 1-(2-chloroethyl)-4-methylpiperazine dihydrochloride and 8 parts of potassium hydroxide in 2-propanol. Isolation of the product as described gives a crude free amine which is crystallized from ether to give 4-[2-(4-methyl-1-piperazinyl)ethyl]-3-phenylcinnoline as shiny pale yellow plates which melt at about 110–111° C. This compound has the following formula

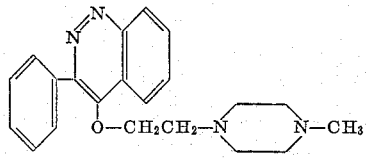

What is claimed is:
1. A compound of the formula

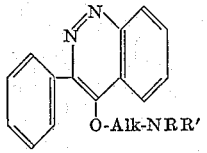

wherein Alk is lower alkylene separating the nitrogens attached thereto by at least 2 carbon atoms; and —NRR' is selected from the group consisting of di(lower alkyl)-amino, piperidino, morpholino, and 4-methyl-1-piperazinyl.

2. A compound of the formula

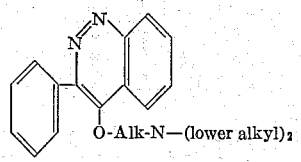

wherein Alk is lower alkylene separating the nitrogens attached thereto by at least 2 carbon atoms.

3. 4-(2-diethylaminoethoxy)-3-phenylcinnoline.
4. 4-(2-dimethylaminoethoxy)-3-phenylcinnoline.
5. 4-(3-dimethylaminopropoxy)-3-phenylcinnoline.
6. 4-[2-(4-methyl-1-piperazinyl)ethoxy]-3-phenylcinnoline.

No references cited.

IRVING MARCUS, *Primary Examiner.*

Disclaimer 3,239,524.—*Harman S. Lowrie*, Glenview, Ill. 3-PHENYL-4-DIALKYL-AMINOALKOXYCINNOLINES. Patent dated Mar. 8, 1966. Disclaimer filed Aug. 30, 1966, by the assignee, *G. D. Searle & Co.*
Hereby enters this disclaimer as to claims 1–6 of said patent.
[*Official Gazette November 29, 1966.*]